United States Patent [19]

Oka

[11] Patent Number: 4,520,583
[45] Date of Patent: Jun. 4, 1985

[54] SHEET FILE MOUNTING/DEMOUNTING MECHANISM IN AN ITEM SELECTION SIGNAL INPUT SYSTEM

[75] Inventor: Takashi Oka, Yamatokoriyama, Japan

[73] Assignee: Sharp Kabushiki Kaisha, Osaka, Japan

[21] Appl. No.: 525,664

[22] Filed: Aug. 23, 1983

[30] Foreign Application Priority Data

Aug. 31, 1982 [JP] Japan .............................. 57-152304
Aug. 31, 1982 [JP] Japan .............................. 57-152305

[51] Int. Cl.³ .............................................. B42F 9/00
[52] U.S. Cl. ........................................ 40/378; 40/379
[58] Field of Search ............... 40/378, 377, 379, 475; 340/365 VL

[56] References Cited

U.S. PATENT DOCUMENTS 2,130,428 10/1938 Katz ...................................... 40/475
3,943,647 3/1976 Holtsch ................................. 40/377
4,257,179 3/1981 Oka et al. ............................. 40/378

Primary Examiner—Hugh R. Chamblee
Assistant Examiner—Cary E. Stone
Attorney, Agent, or Firm—Birch, Stewart, Kolasch & Birch

[57] ABSTRACT

An item selection signal input system includes a sheet file carrying a plurality of item lists, each of the item lists being provided with item indicia for marking switches formed on a keyboard panel. The sheet file is removably wound around a bidirectionally rotatable drum through the use of a claw provided on the bidirectionally rotatable drum and an engaging member secured to one end of the sheet file. When different key markings are required, the sheet file is demounted from the bidirectionally rotatable drum, and a new sheet file is mounted on the bidirectionally rotatable drum through the use of the claw and the engaging member.

13 Claims, 13 Drawing Figures

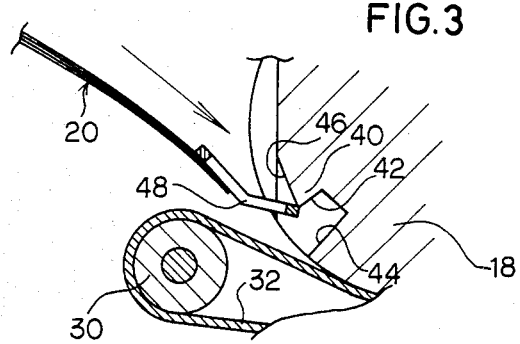
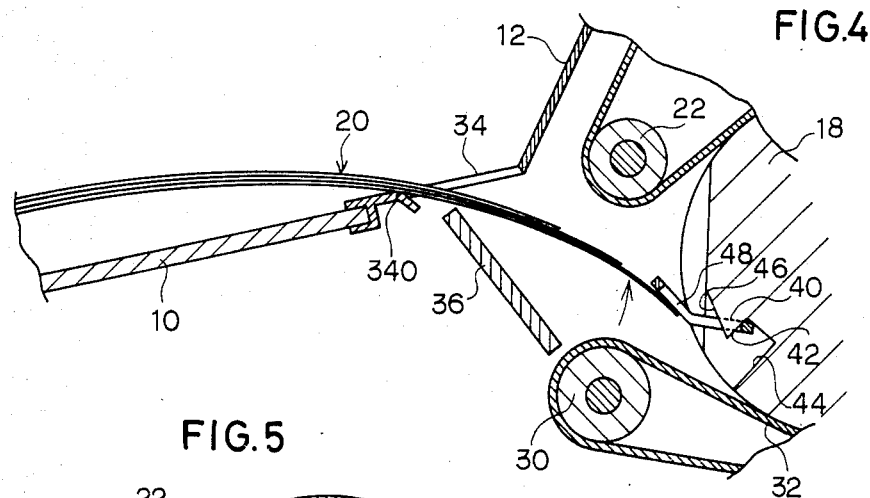
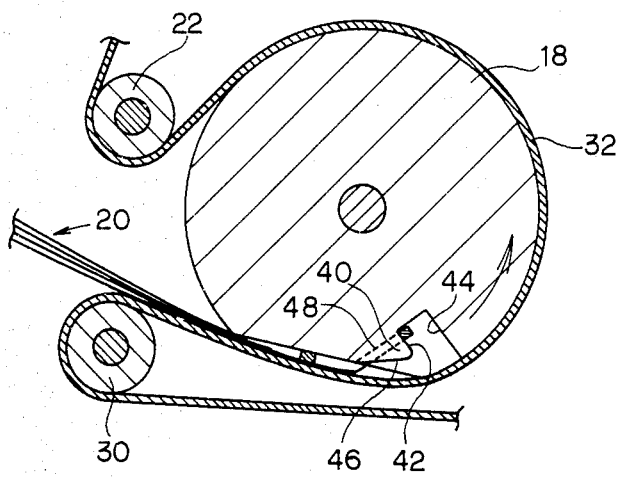

SHEET FILE MOUNTING/DEMOUNTING MECHANISM IN AN ITEM SELECTION SIGNAL INPUT SYSTEM

BACKGROUND AND SUMMARY OF THE INVENTION

The present invention relates to an item selection signal input system which includes a keyboard panel having a plurality of matrix aligned switches, and a plurality of item lists for marking the switches included in the keyboard panel.

The present invention relates, more particularly, to a sheet file mounting/demounting mechanism for facilitating the exchange of the plurality of item lists in the item selection signal input system.

An example of an item selection signal input system is disclosed in U.S. Pat. No. 4,257,179, entitled "ITEM LIST SETTING MECHANISM IN AN ITEM SELECTION SIGNAL INPUT SYSTEM", issued on Mar. 24, 1981 and assigned to the same assignee as the present application. In such an item selection signal input system, a plurality of item lists (sheet file) are mounted around a drum, and a desired item list is selected while the drum rotates in a predetermined direction. The thus selected item list is fed to a space formed below the keyboard panel while the drum rotates in the counter direction, thereby labeling the switches included in the matrix keyboard panel. Each switch included in the keyboard panel performs an operation in accordance with the marking provided by the selected item list.

In such an item selection signal input system, there is a possibility that it would be desired to exchange the item lists when additional markings are required other than those included in the item lists then mounted on the drum. In the conventional item selection signal input system such as disclosed in U.S. Pat. No. 4,257,179, each item list is individually secured to the drum. Therefore, the exchange of the item lists was troublesome in the conventional system.

Accordingly, an object of the present invention is to provide an item selection signal input system, wherein item lists are easily exchanged.

Another object of the present invention is to provide an item list mounting mechanism for facilitating the mounting operation of the item lists around a drum in an item selection signal input system. Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a plurality of item lists are secured to a base sheet to form a sheet file. At one end of the base sheet, an engaging member is provided, which is coupled to a claw disposed at a desired portion of a drum so that the sheet file is mounted around the drum in a manner that the item lists are wound around the drum. The thus constructed engagement facilitates the mounting operation of the sheet file around the drum, and the demounting operation of the sheet file from the drum.

In a preferred form, a guide sheet is secured to a desired portion of the drum in order to guide the sheet file to the claw when the sheet file is manually introduced into the item selection signal input system.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 3, 4, 5, 6 and 7 are sectional views for explaining operational modes of the sheet file mounting/demounting mechanism of FIG. 2;

DESCRIPTION OF THE PREFERRED EMBODIMENTS

Figure 1:
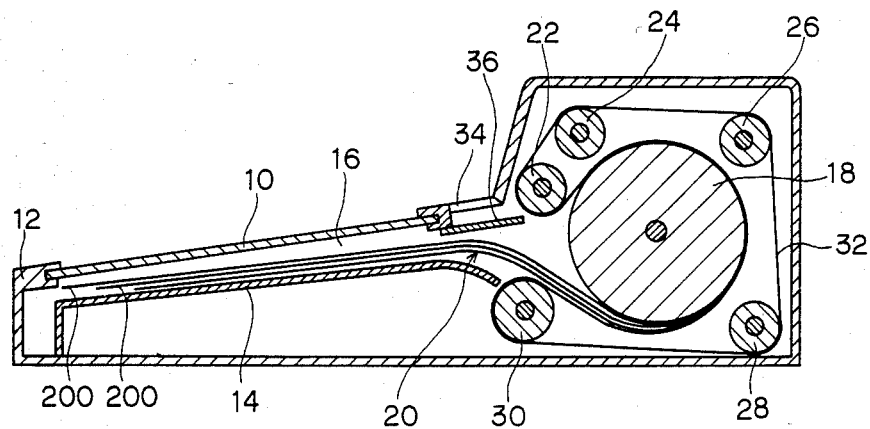
FIG. 1 is a sectional view of an item selection signal input system employing an embodiment of a sheet file mounting/demounting mechanism of the present invention.

An item selection signal input system generally includes, as shown in FIG. 1, a transparent keyboard panel 10 on which a plurality of touch sensitive switches are aligned in a matrix fashion. The transparent keyboard panel 10 is disposed on one surface of a housing 12 of the item selection signal input system. A guide plate 14 is disposed below the transparent keyboard panel 10 so as to form a guide space 16 under the transparent keyboard panel 10. A bidirectionally rotatable drum 18 is disposed in the housing 12, around which a sheet file 20, including a plurality of item lists 200, is wound. Rollers 22, 24, 26, 28 and 30 are disposed around the drum 18. An endless resilient belt 32 is extended around the rollers 22, 24, 26, 28 and 30 so as to tightly wind the sheet file 20 around the drum 18.

A bidirectionally rotatable motor, preferably a permanent magnet pulse motor, is coupled to the drum 18 and to the rollers 22, 24, 26, 28 and 30 so that the endless resilient belt 32 moves with a same velocity as the drum 18. When the drum 18 is driven to rotate in the counter clockwise direction as seen in FIG. 1, the sheet file 20 rotates around the drum 18. A selection system is provided for selecting a desired item list 200 while the drum 18 rotates in the counter clockwise direction. When the desired item list 200 is selected, the drum 18 is driven to rotate in the clockwise direction so that the sheet file 20 is fed through the guide space 16 in a manner that the selected item list 200 is located at the uppermost position to label the matrix aligned switches formed on the transparent keyboard panel 10.

An aperture 34 is formed in the housing 12 for inserting or drawing out the sheet file 20 into or from the item selection signal input system when the sheet file 20 is desired to be exchanged. A rotatable plate 36 is disposed near the aperture 34 for selectively communicating the drum 18 with the aperture 34 and the guide space 16 formed under the transparent keyboard panel 10.

Figure 2:
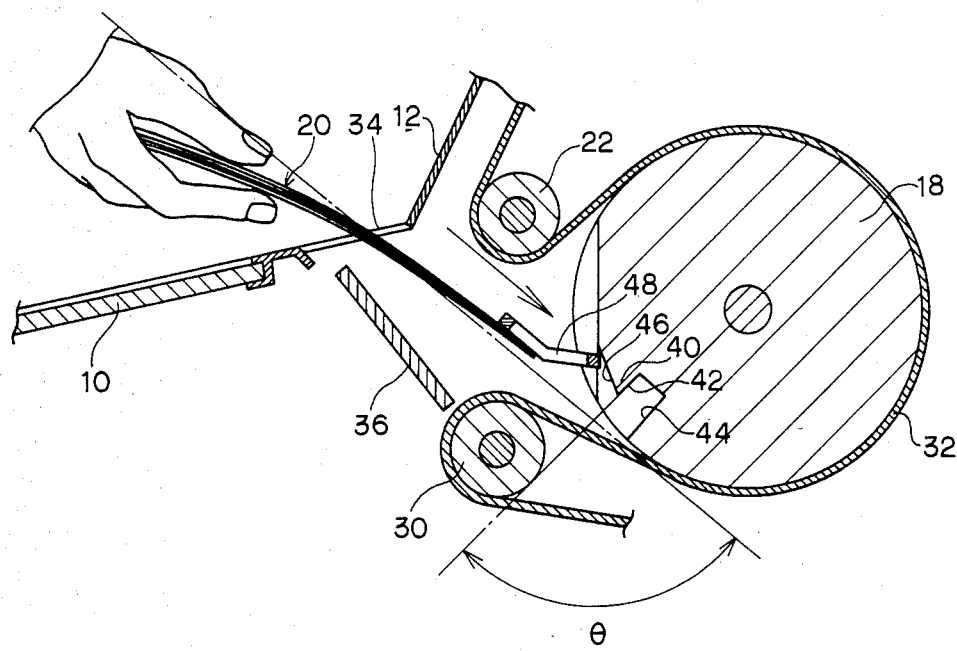
FIG. 2 is an enlarged sectional view of the sheet file mounting/demounting mechanism included in the item selection signal input system of FIG. 1.

FIG. 2 shows an embodiment of a sheet file mounting/demounting mechanism of the present invention. Like elements corresponding to those of FIG. 1 are indicated by like numerals.

A claw 40 is formed at a desired portion of the drum 18. The claw 40 includes an engaging surface 42 which confronts a stopper surface 44 formed in the drum 18. The claw 40 further includes a guide surface 46 for guiding the sheet file 20 to the claw 40 when a new sheet file 20 is manually inserted through the aperture 34 as shown in FIG. 2. At a base portion of the sheet file 20, an engaging member 48 is disposed, which is coupled to the claw 40 when the sheet file 20 is fixed to the drum 18. The engaging member 48 includes a frame for defining an opening in which the claw 40 is fit when the engaging member 48 is coupled to the claw 40. As shown in FIG. 2, the engaging member 48 is bent at the middle of the frame for ensuring the coupling of the engaging member 48 to the claw 40. The engaging surface 42 is formed such that an angle $\theta$ formed between the inserting direction of the sheet file 20 and the engaging surface 42 is within a range of 90° through 110° when the exchanging operation is conducted, thereby facilitating the mounting and demounting operations of the sheet file 20 on the drum 18.

When a new sheet file 20 is desired to be set in the item selection signal input system, the rotatable plate 36 is rotated to communicated the aperture 34 with the drum 18 as shown in FIG. 4. The permanent magnet pulse motor is activated to rotate the drum 18, and the drum 18 is stopped at a position where the claw 40 is located near the roller 30 during the course of the rotation of the drum 18. Then, the sheet file 20 is manually inserted through the aperture 34. The leading edge of the engaging member 48 slides on the guide surface 46 as shown in FIG. 3 toward the stopper surface 44. When the leading edge of the engaging member 48 reaches the stopper surface 44, the operator releases the sheet file 20. The sheet file 20 is supported by an edge 340 of the aperture 34. The sheet file 20 rotates in the counter clockwise direction as seen in FIG. 4 around the edge 340 due to the weight and the elasticity of the sheet file 20. Therefore, the engaging member 48 is rotated upward till the claw 40 fits in the opening formed in the engaging member 48 so as to couple the engaging member 48 to the claw 40 as shown in FIG. 4.

Thereafter, the permanent magnet pulse motor is activated to rotate the drum 18 in the counter clockwise direction for winding the sheet file 20 around the drum 18 as shown in FIG. 5. When the winding operation is completed, the rotatable plate 36 is rotated to close the aperture 34 and to communicate the drum 18 with the guide space 16 formed under the transparent keyboard panel 10.

Under these conditions, a desired item list 200 is selected while the drum 18 rotates in the counter clockwise direction. Free ends of the item lists 200 are separated from the drum 18 near the roller 22. When the free end of the desired item list 200 is separated from the surface of the drum 18, that is, free from the endless belt 32, the drum rotation is stopped. Then, the drum 18 is rotated in the clockwise direction so that the sheet file 20 is fed into the guide space 16. The selected item list 200 is positioned at the upper surface of the sheet file 20.

Figure 6:
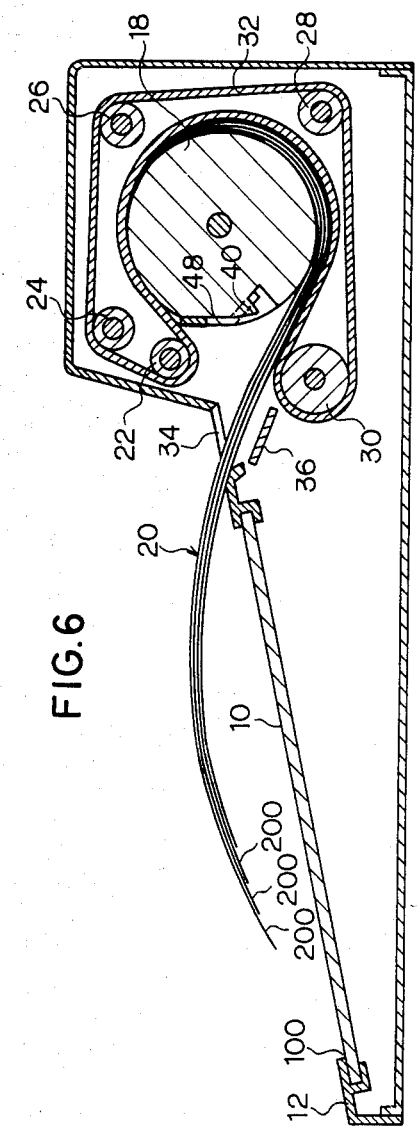

When it is desired to demount the sheet file 20 from the drum 18, the rotatable plate 36 is rotated to close the guide space 16 and to open the aperture 34. The drum 18 is rotated in the clockwise direction. The item lists 200 are separated from the drum surface near the roller 30, and the sheet file 20 is pushed away through the aperture 34 along the rotatable plate 36. The drum rotation is terminated when the leading edge of the sheet file 20 reaches an edge 100 of the transparent keyboard panel 10 as shown in FIG. 6 so as not to damage the sheet file 20.

Figure 7:
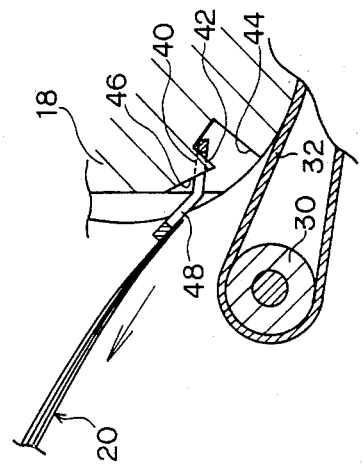

Thereafter, the sheet file 20 is pulled by the operator. In response to the pulling operation conducted by the operator, the drum 18 rotates in the clockwise direction to locate the claw 40 near the roller 30 as shown in FIG. 7. When the sheet file 20 is further pulled by the operator, the engaging member 48 is released from the claw 40 due to the elasticity of the sheet file 20. The demounting operation is conducted smoothly because the angle $\theta$ formed between the pulling direction of the sheet file 20 and the engaging surface 42 is selected within the range of 90° through 110°. The drum 18 is held stationary when the demounting operation is completed and prepared for the mounting operation of another sheet file 20, because the permanent magnet pulse motor is connected to the drum 18. A braking system can be employed to hold the drum 18 at a position suited for the mounting operation of the new sheet file 20.

Figure 8:
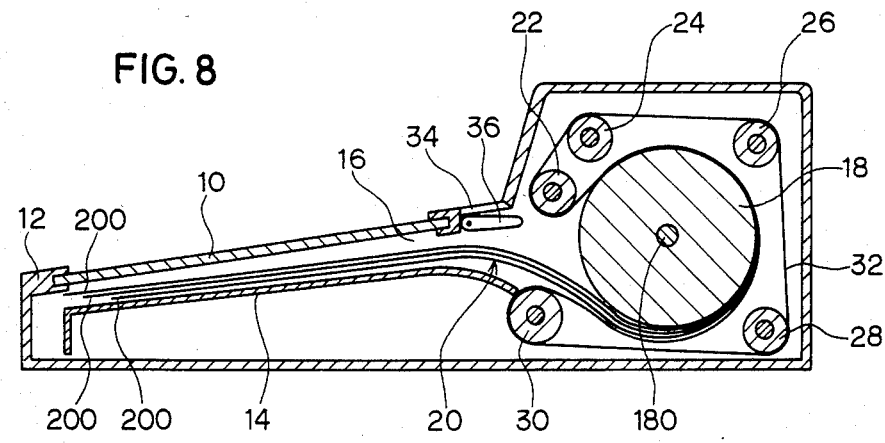
FIG. 8 is a sectional view of an item selection signal input system employing another embodiment of a sheet file mounting/demounting mechanism of the present invention.

FIG. 8 shows another item selection signal input system employing another embodiment of the sheet file mounting/demounting mechanism of the present invention. Like elements corresponding to those of FIG. 1 are indicated by like numerals. The sheet file mounting-/demounting mechanism of this embodiment includes a guide sheet 60, secured to the drum 18 near the claw 40, for guiding the sheet file 20 when the mounting operation is carried out.

Figure 9:
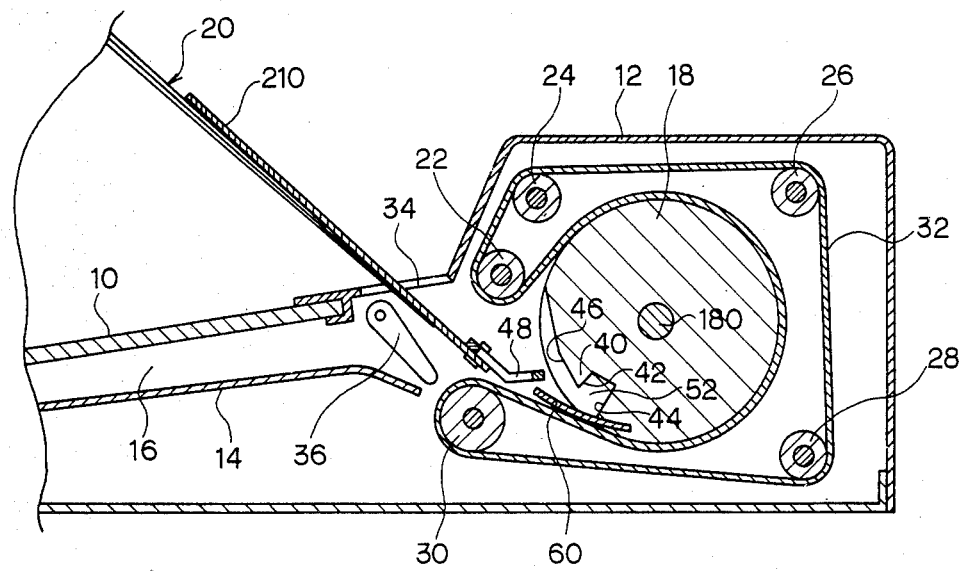
FIG. 9 is an enlarged sectional view of the sheet file mounting/demounting mechanism included in the item selection signal input system of FIG. 8.

A plurality of opaque item lists 200 are supported by a base sheet 210 to form the sheet file 20 as shown in FIG. 9. The engaging member 48 is secured to one end of the base sheet 210.

Figure 10:
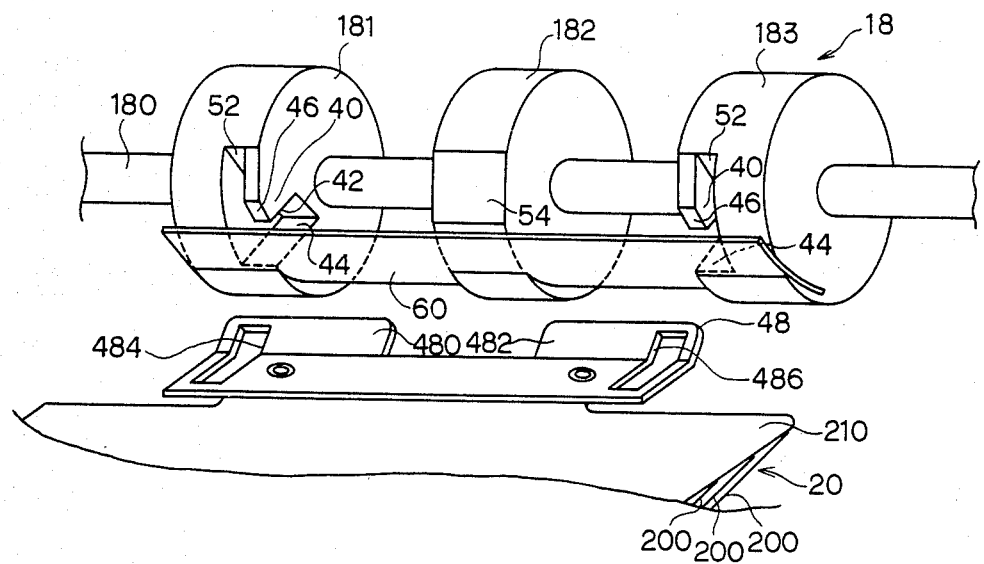
FIG. 10 is an enlarged perspective view of an essential part of the sheet file mounting/demounting mechanism of FIG. 9.

The drum 18 includes three cylinders 181, 182 and 183 mounted on a rotatable shaft 180. The cylinders 181 and 183 are provided with indents 52 for accommodating the claw 40 as shown in FIG. 10. The guide sheet 60 is fixed to the cylinders 181, 182 and 183 near the stopper surface 44 formed in the indent 52 in a manner that the free end of the guide sheet 60 is separated from the surface of the cylinders 181, 182 and 183.

The engaging member 48 includes extended, bent portions 480 and 482 which confront the cylinders 181 and 183, respectively. Openings 484 and 486 are formed in the engaging member 48 at positions corresponding to the claws 40 formed in the cylinders 181 and 183, respectively. A cutoff 54 is formed in the cylinder 182 in order not to disturb the engagement of the engaging member 48 with the claws 40 formed in the cylinders 181 and 183.

Figure 11:
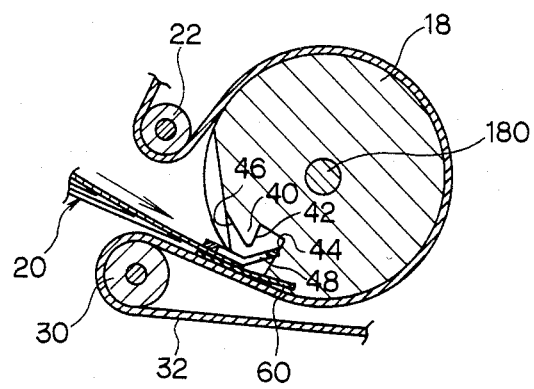
FIGS. 11, 12 and 13 are sectional views for explaining operational modes of the sheet file mounting/demounting mechanism of FIG. 9.

When the sheet file 20 is desired to be mounted on the drum 18, the rotatable plate 36 is rotated to open the aperture 34. The permanent magnet pulse motor is rotated and stopped so as to place the guide sheet 60 near the roller 30. Then, the sheet file 20 is manually inserted through the aperture 34. The leading edge of the engaging member 48 is guided by the guide sheet 60, and the engaging member 48 slides on the guide sheet 60 to contact the stopper surface 44 as shown in FIG. 11. At this momemnt, the claws 40 do not completely fit in the openings 484 and 486. However, the sheet file 20 is supported by the guide sheet 60 so as to maintain the relationships between the claws 40 and the openings 484 and 486.

Figure 12:
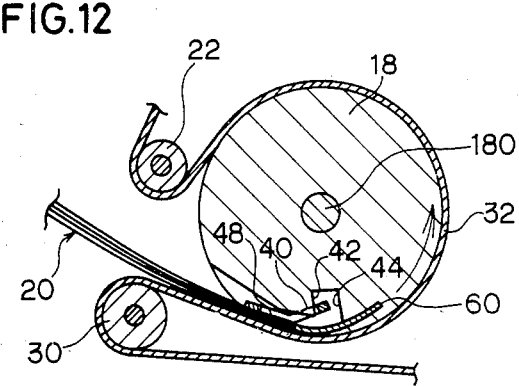

Then, the drum 18 is rotated in the counter clockwise direction. The claws 40 fit in the openings 484 and 486 so that the sheet file 20 is pulled by the rotation of the drum 18. That is, the engaging member 48 is coupled to the claws 40, and the sheet file 20 is wound around the drum 18 as shown in FIG. 12. The guide sheet 60 is depressed to the drum surface by the endless belt 32, whereby the sheet file 20 is tightly wound around the drum 18.

Figure 13:
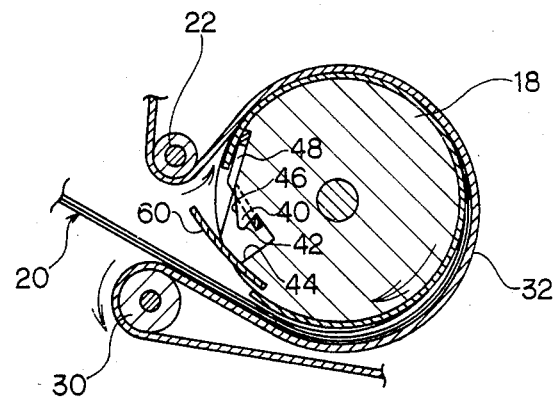

The demounting operation of the sheet file 20 from the drum 18 is similar to that described with reference to FIGS. 6 and 7. FIG. 13 shows the demounting operation in this embodiment.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A sheet file mounting mechanism comprising:
   a bidirectionally rotatable drum;
   a sheet file comprising a base sheet and a plurality of item lists secured to said base sheet;
   an engaging member secured to one end of said sheet file; and
   a claw disposed at a predetermined position of said bidirectionally rotatable drum so as to catch said engaging member, said claw comprising:
   an engaging surface for catching said engaging member; and
   a guide surface for guiding said engaging member to said engaging surface, wherein said engaging member is secured to one end of said base sheet.

2. The sheet file mounting mechanism of claim 1, further comprising:
   a guide sheet secured to said bidirectionally rotatable drum near said claw for guiding said sheet file to said claw when the sheet file is being mounted around said bidirectionally rotatable drum.

3. An item selection signal input system comprising:
   a housing;
   a keyboard panel secured to said housing, said keyboard panel including a plurality of switches;
   a sheet file comprising a base sheet and a plurality of item lists, each item list being provided with item indicia at positions corresponding to said switches and one end of each of said plurality of item lists being secured to said base sheet;
   a guide space for guiding said sheet file into alignment with said keyboard panel;
   a directionally rotatable drum around which said sheet file is wound;
   an aperture formed at a predetermined position of said housing in order to manually introduce said sheet file into the item selection signal input system for mounting said sheet file around said bidirectionally rotatable drum; and
   a rotatable plate disposed near said aperture for selectively communicating said bidirectionally rotatable drum with said guide space and said aperture.

4. The item selection signal input system of claim 3, further comprising:
   an engaging member secured to one end of said base sheet; and
   a claw disposed at a predetermined position of said bidirectionally rotatable drum so as to catch said engaging member.

5. The item selection signal input system of claim 4, said claw comprising:
   an engaging surface for catching said engaging member; and
   a guide surface for guiding said engaging member to said engaging surface.

6. The item selection signal input system of claim 5, further comprising:
   a guide sheet secured to said bidirectionally rotatable drum near said claw for guiding said engaging member to said claw when said sheet file is being manually introduced through said aperture toward said bidirectionally rotatable drum.

7. A sheet file mounting mechanism comprising:
   a bidirectionally rotatable drum;
   a sheet file;
   an engaging member secured to one end of said sheet file; and
   means disposed at a predetermined position of said bidirectionally rotatable drum for catching said engaging member when said drum is rotated in a first direction for mounting said sheet file, and for releasing said engaging member when said drum is rotated in an opposite direction for demounting said sheet file.

8. The mechanism of claim 7, wherein said means comprises a claw including
   an engaging surface for catching said engaging member; and
   a guide surface for guiding said engaging member to said engaging surface.

9. The mechanism of claim 7, wherein said sheet file comprises a plurality of sheets.

10. An item selection signal input system comprising:
    a housing;
    a keyboard panel secured to said housing, said keyboard panel including a plurality of switches;
    a sheet file comprising indicia at positions corresponding to said switches;
    guide means for guiding said sheet file into alignment with said keyboard panel;
    a bidirectionally rotatable drum around when said sheet file is wound;
    aperture means formed at a predetermined position of said housing for facilitating mounting and demounting of said sheet file around said bidirectionally rotatable drum; and
    a plate disposed near said aperture for selectively communicating said bidirectionally rotatable drum with said guide means and said aperture for selectively facilitating guiding of said sheet file into alignment with said keyboard panel and for mounting and demounting of said sheet file, respectively.

11. The system of claim 10, wherein said sheet file comprises a plurality of sheets, each sheet comprising indicia thereon.

12. The system of claim 10, wherein said plate is pivotable for selectively communicating said drum with said guide space and said aperture.

13. The system of claim 10, further comprising:
an engaging member secured to said sheet file; and
means disposed on said drum for catching said engaging member when said drum is rotated in a first direction for mounting said sheet file, and for releasing said engaging member when said drum is rotated in an opposite direction for demounting said sheet file.

* * * * *